(12) United States Patent
Molgaard et al.

(10) Patent No.: US 10,237,473 B2
(45) Date of Patent: Mar. 19, 2019

(54) DEPTH MAP CALCULATION IN A STEREO CAMERA SYSTEM

(71) Applicant: Apple Inc., Cupertino, CA (US)

(72) Inventors: Claus Molgaard, Los Gatos, CA (US); Thomas E. Bishop, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 432 days.

(21) Appl. No.: 14/864,603

(22) Filed: Sep. 24, 2015

(65) Prior Publication Data

US 2017/0069097 A1 Mar. 9, 2017

Related U.S. Application Data

(60) Provisional application No. 62/214,725, filed on Sep. 4, 2015.

(51) Int. Cl.
*H04N 13/00* (2018.01)
*H04N 5/232* (2006.01)
*H04N 13/02* (2006.01)
*G06T 7/593* (2017.01)

(52) U.S. Cl.
CPC ......... *H04N 5/23238* (2013.01); *G06T 7/593* (2017.01); *H04N 13/0239* (2013.01); *H04N 13/0246* (2013.01); *H04N 2013/0081* (2013.01)

(58) Field of Classification Search
CPC ................ G06T 7/593; H04N 13/0239; H04N 13/0246; H04N 2013/0081; H04N 5/23238
See application file for complete search history.

(56) References Cited

U.S. PATENT DOCUMENTS

| 8,971,611 | B2 | 3/2015 | Takeshita | |
|---|---|---|---|---|
| 9,025,895 | B2 | 5/2015 | Venkataraman | |
| 2011/0069189 | A1* | 3/2011 | Venkataraman | H01L 27/14618 348/218.1 |
| 2012/0147205 | A1* | 6/2012 | Lelescu | H04N 13/0029 348/218.1 |
| 2012/0200673 | A1 | 8/2012 | Tagawa | |
| 2014/0267243 | A1* | 9/2014 | Venkataraman | G06T 7/0065 345/419 |
| 2014/0267602 | A1 | 9/2014 | Tzur | |
| 2014/0269898 | A1* | 9/2014 | Thirumalai | H04N 19/597 375/240.02 |
| 2015/0029311 | A1 | 1/2015 | Cheng | |
| 2015/0085073 | A1* | 3/2015 | Bruls | H04N 13/0022 348/43 |

\* cited by examiner

*Primary Examiner* — Md N Haque
(74) *Attorney, Agent, or Firm* — Blank Rome LLP (57) ABSTRACT

A method for generating a depth map is described. The method includes obtaining a first image of a scene from a first image capture unit, the first image having a first depth-of-field (DOF), obtaining a second image of the scene from a second image capture unit, the second image having a second DOF that is different than the first DOF. Each pixel in the second image has a corresponding pixel in the first image. The method also includes generating a plurality of third images, each corresponding to a blurred version of the second image at each of a plurality of specified depths, generating a plurality of fourth images, each representing a difference between the first image and one or the plurality of third images, and generating a depth map where each pixel in the depth map is based on the pixels in one of the plurality of fourth images.

20 Claims, 6 Drawing Sheets

DEPTH MAP CALCULATION IN A STEREO CAMERA SYSTEM

BACKGROUND

This disclosure relates generally to the field of digital image capture and processing, and more particularly to the field of depth map calculation.

The process of estimating the depth of a scene from two cameras is commonly referred to as stereoscopic vision and, when using multiple cameras, multi-view stereo. In practice, many multi-camera systems use disparity as a proxy for depth. (As used herein, disparity is taken to mean the difference in the projected location of a scene point in one image compared to that same point in another image captured by a different camera.) With a geometrically calibrated camera system, disparity can be mapped onto scene depth. The fundamental task for such multi-camera vision-based depth estimation systems then is to find matches, or correspondences, of points between images from two or more cameras. Using geometric calibration, the correspondences of a point in a reference image (A) can be shown to lie along a certain line, curve or path in another image (B).

Difficulties in generating a depth map may arise when disparity is not easily calculated. For example, if the stereo camera system is directed at an object that has a pattern which makes determining disparity more difficult.

SUMMARY

In one embodiment, a method for generating a depth map is described. The method includes obtaining a first image of a scene from a first image capture unit, the first image having a first depth-of-field (DOF) and a first number of pixels, obtaining a second image of the scene from a second image capture unit, the second image having a second DOF that is different than the first DOF, the second image having the first number of pixels, wherein each pixel in the second image has a corresponding pixel in the first image, generating a plurality of third images, each corresponding to a blurred version of the second image at each of a plurality of specified depths, generating a plurality of fourth images, each representing a difference between the first image and one of the plurality of third images, and generating a depth map having the first number of pixels, wherein each pixel in the depth map is based on a plurality of pixels, wherein each of the plurality of pixels corresponds to the pixel in one of the plurality of fourth images.

In another embodiment, the method may be embodied in computer executable program code and stored in a non-transitory storage device. In yet another embodiment, the method may be implemented in an electronic device having image capture capabilities.

DETAILED DESCRIPTION

This disclosure pertains to systems, methods, and computer readable media for generating a depth map. In general, techniques are disclosed for using a stereo camera system to capture two images of an object, determining a difference in blur between the two images at a particular point, and determining a depth for a depth map based on the difference in blur. In one or more embodiments, disparity information between the two images may also be determined and used in generating a depth map. This may be useful, for example, in a stereo camera system that includes two cameras with different depth-of-fields (DOF's) at the same focal length.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100*a* and 100*b*). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

For purposes of this disclosure, the term "lens" refers to a lens assembly, which could include multiple lenses. In one or more embodiments, the lens may be moved to various positions to capture images at multiple depths and, as a result, multiple points of focus. Further in one or more embodiments, the lens may refer to any kind of lens, such as a telescopic lens or a wide angle lens. As such, the term lens can mean a single optical element or multiple elements configured into a stack or other arrangement.

For purposes of this disclosure, the term "camera" refers to a single lens assembly along with the sensor element and other circuitry utilized to capture an image. For purposes of this disclosure, two or more cameras may share a single sensor element and other circuitry, but include two different lens assemblies. However, in one or more embodiments, two or more cameras may include separate lens assemblies as well as separate sensor elements and circuitry.

Figure 1:
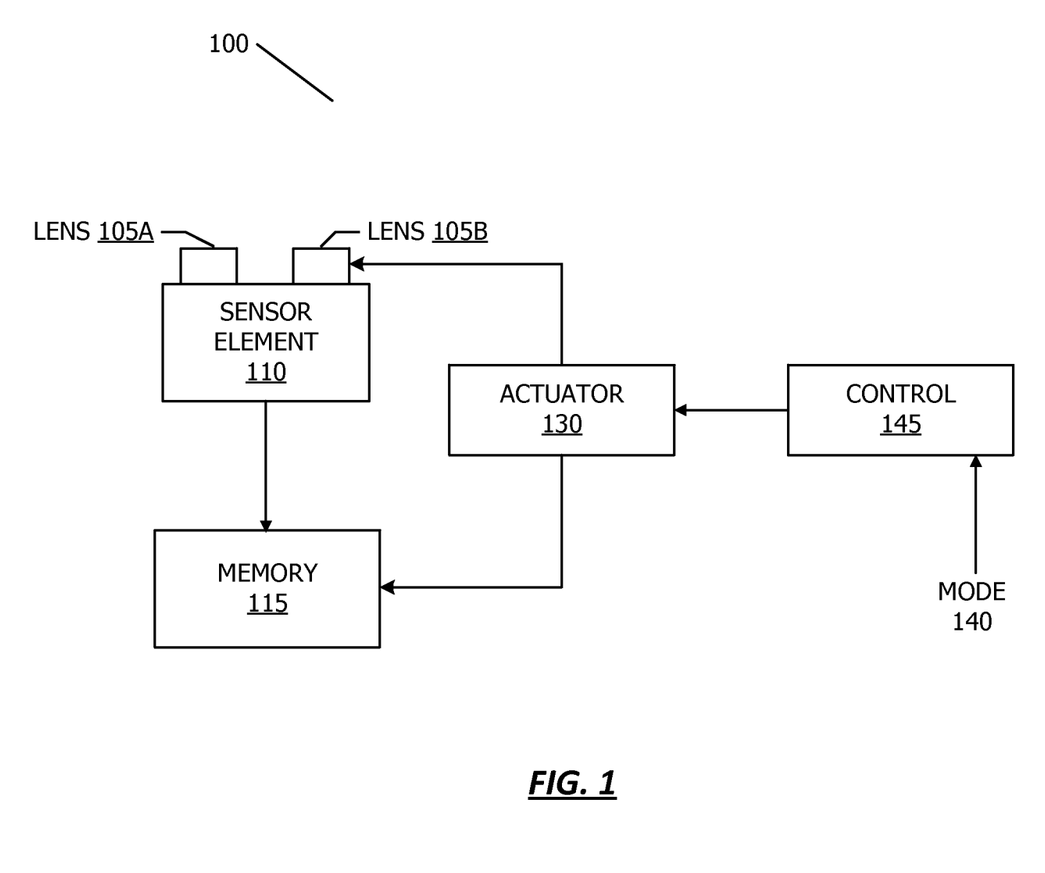
FIG. 1 shows, in block diagram form, a simplified camera system according to one or more embodiments.

Referring to FIG. 1, a simplified block diagram of camera system 100 is depicted, in accordance with one or more embodiments of the disclosure. Camera system 100 may be part of a camera, such as a digital camera. Camera system 100 may also be part of a multifunctional device, such as a mobile phone, tablet computer, personal digital assistant, portable music/video player, or any other electronic device that includes a camera system.

Camera system 100 may include one or more lenses 105. More specifically, as described above, lenses 105A and 105B may actually each include a lens assembly, which may include a number of optical lenses, each with various lens characteristics. For example, each lens may include its own physical imperfections that impact the quality of an image captured by the particular lens. When multiple lenses are combined, for example in the case of a compound lens, the various physical characteristics of the lenses may impact the characteristics of images captured through the lens assembly, such as focal points. In addition, each of lenses 105A and 105B may have similar characteristics, or may have different characteristics, such as a different depth of field (DOF).

As depicted in FIG. 1, camera system 100 may also include an image sensor 110. Image sensor 110 may be a sensor that detects and conveys the information that constitutes an image. Light may flow through the lens 105 prior to being detected by image sensor 110 and be stored, for example, in memory 115. In one or more embodiments, the camera system 100 may include multiple lens systems 105A and 105B, and each of the lens systems may be associated with a different sensor element, or, as shown, one or more of the lens systems may share a sensor element 110.

Camera system 100 may also include an actuator 130, and mode select input 140. In one or more embodiments, actuator 130 may manage control of one or more of the lens assemblies 105. For example, the actuator 130 may control focus and aperture size. Orientation sensor 135 and mode select input 140 may supply input to control unit 145. In one embodiment, camera system may use a charged coupled device (or a complementary metal-oxide semiconductor as image sensor 110), an electro-mechanical unit (e.g., a voice coil motor) as actuator 130.

Figure 2:
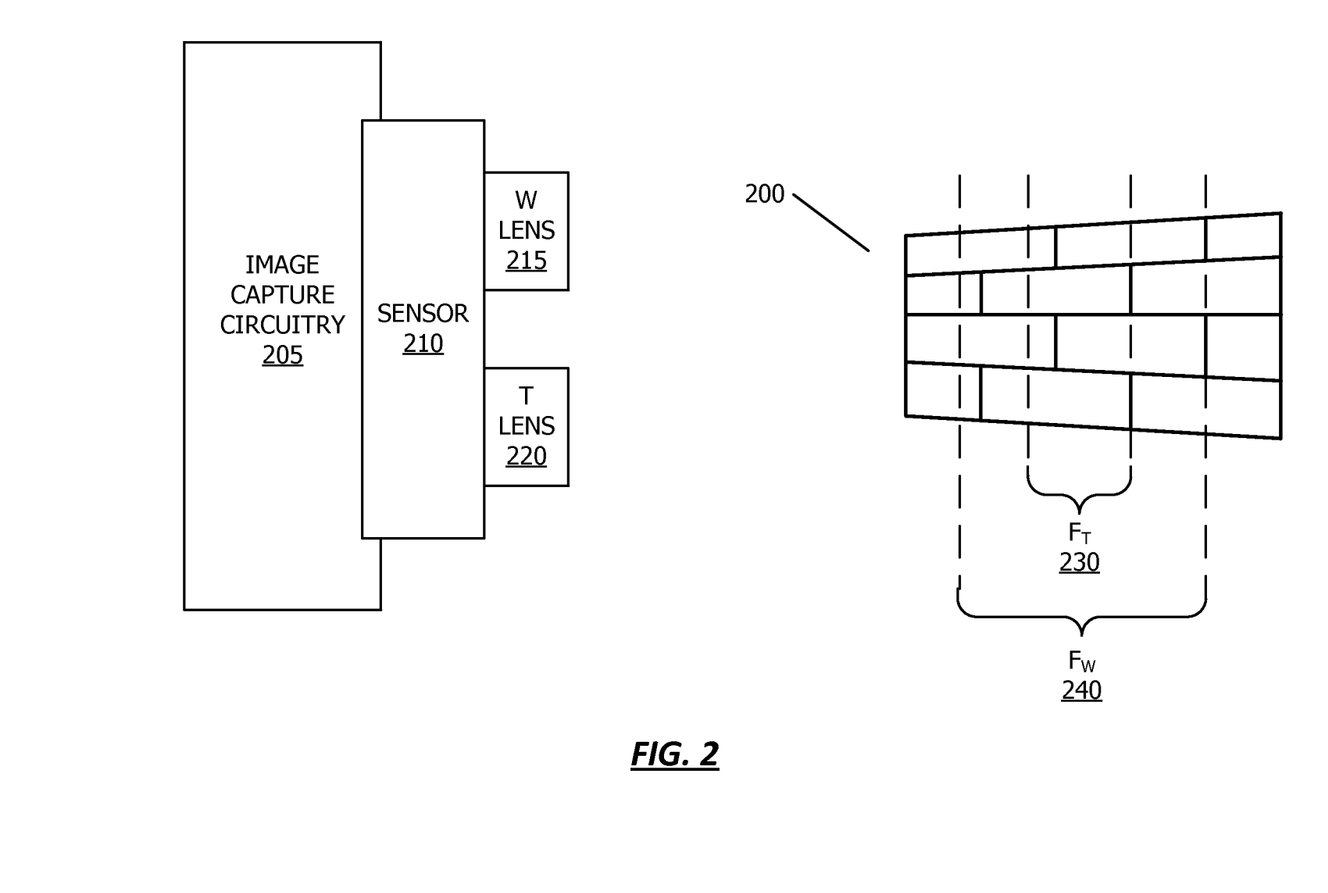
FIG. 2 shows, in block diagram form, an example multi camera system for generating a depth map.

Turning to FIG. 2, an example block diagram is depicted indicating a type of camera system that may be calibrated according to one or more embodiments. In one or more embodiments, lens 215A and lens 215B may be independent lens assemblies, each having their own optical characteristics, that capture images of an object, such as object 200 in different ways. In one or more embodiments, image capture circuitry 205 may include two (or more) lens assemblies. For purposes of the example, the camera system may include a wide angle lens 215 and a telescopic lens 220. Each lens assembly may have different characteristics, such as a different focal length. For example, wide angle lens 240 may have a wider focal length 240 than the focal length of the telescopic lens 230. Each lens assembly may have a separate associated sensor element 210. Alternatively, two or more lens assemblies may share a common sensor element.

Figure 3:
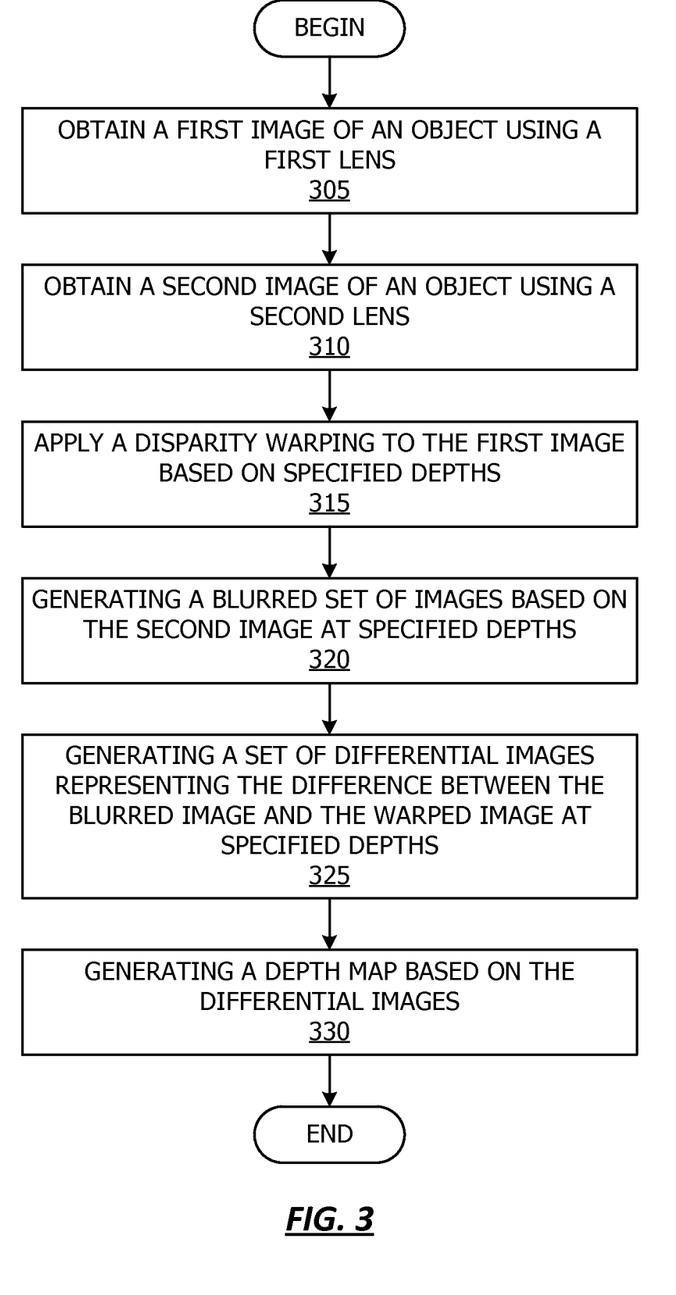
FIG. 3 shows, flow chart form, method for generating a depth map using a stereo camera system.

Turning to FIG. 3, a method for generating a depth map is presented in the form of a flow chart. Although the steps are depicted in a particular order, the various steps in the flowchart could occur in a different order. In addition, any of the various steps could be omitted, or other steps could be included, according to embodiments.

The flow chart begins at 305 where the first camera, such as that including lens assembly 215A captures an image of an object, such as object 200. At 310, the second camera captures a second image of the same object. In one or more embodiments, the first and second camera may be part of a stereo camera system. The first and second camera may have different depths of focus. For example, the first camera may include a telephoto lens, whereas the second camera includes a wide angle lens. In one or more embodiments, the camera may capture an image of any target, whether it is known or unknown.

The flow chart continues at 315, and a set of images are generated by applying a disparity warping to the first image based on a set of specified depths. In one or more embodiments, the disparity between the first image and the second image may be known to the camera system. For example, during calibration, a disparity map may be generated that indicates the disparity between the images of the two cameras at various distances. Thus, a disparity warping may be applied to the first image at various depths to generate a set of images to compensate for the difference between the first and second cameras when capturing images of the same object. In one or more embodiment, hypothesis depths may be determined based on any variety of factors. For example, in one or more embodiments, the depths may be selected based on the DOF of the first camera or the second camera. As another example, the hypothesis depths may be predetermined. Further, as another example, an initial disparity map for the scene may be found based upon stereo registration, ignoring the difference in depth of field. These disparities may be used with the calibration to determine the initial depth hypothesis.

The method continue at 320 and a blurred set of images are generated based on the second image at the specified hypothesis depths. In one or more embodiments, generating the blurred set of images involves applying a blur to the image captured by the second camera to artificially create a set of images based on what the second image would look like blurred at the specified hypothesis depths. In one or more embodiments, the blur may be determined based on a lens optical model. Any method may be used to determine the amount of blur. For example, deconvolution or learned blur-size detectors may be used.

In one or more embodiments, a blur may also be applied to the warped image to compensate for the difference in focus between the first camera and the second camera at the plurality of specified depths. This may occur, for example, if there are points in the second image that are out of the DOF of the first image. Thus, the warped images may also have to be blurred to simulate the blur in the second image for the depth.

The method continues at 325, and a set of differential images is generated. The differential images are generated by determining, for each specified hypothesis depth, how far off the warped image from the first camera is compared to the blurred image of the second camera.

The method continues at 330, and the depth map is generated based on the differential images. In one or more embodiments, for each pixel in the image, a determination is made regarding which differential image is the closest. That is, at what hypothesis depth is the best guess, or closest match, based on the warped image from the first camera and the blurred image from the second camera.

In one or more embodiments, additional process may be incorporated to ensure a better guess of depth at a particular point. For example, a regularization or smoothing process may be applied to any of the generated sets of images in order to clean the resulting depth map.

Figure 4:
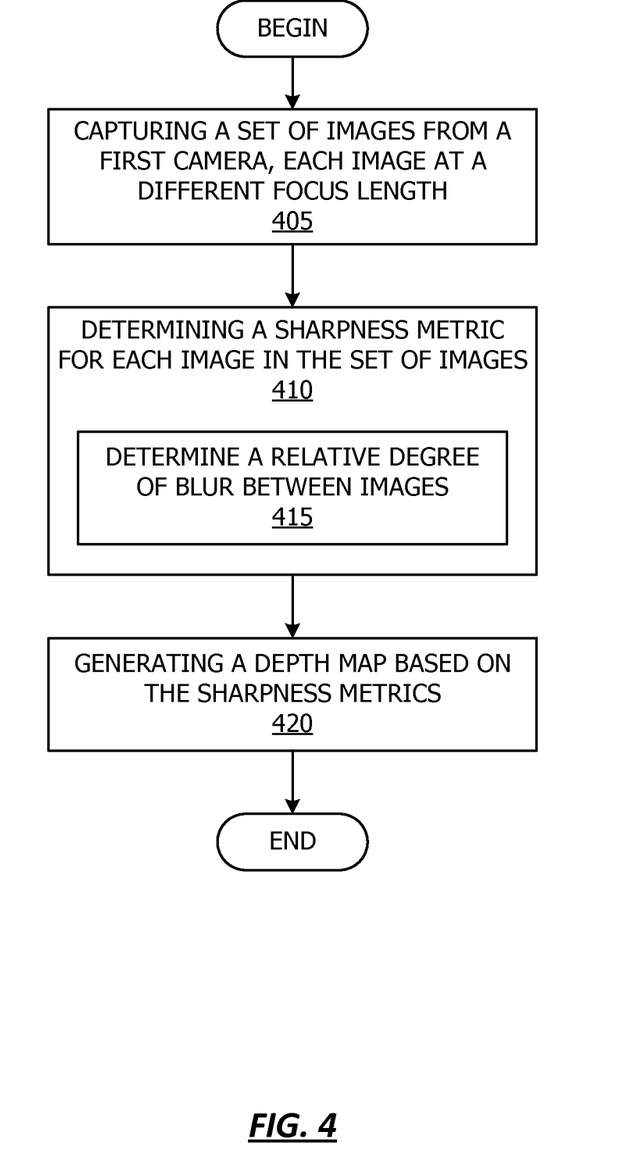
FIG. 4 shows, in flow chart form, an example method of generating a depth map using an image stack.

Referring now to FIG. 4, an example flow chart is depicted of a method of generating a depth map, according to one or more embodiments of the invention. Although the steps are depicted in a particular order, the various steps in the flowchart could occur in a different order. In addition, any of the various steps could be omitted, or other steps could be included, according to embodiments.

The flow chart begins at 405, and a set of images are captured from a first camera. The images may be captured at a variety of focus settings. In one or more embodiments, a focal stack of images is captured by one camera, such as the camera with the telephoto lens.

The method continues at 410, and a sharpness metric is determined for each image in the set of images captured in 405. In one or more embodiments, the sharpness metric may be determined in any number of ways. For example, edge detection methods may be used. Any method may be used to determine the amount of blur. For example, deconvolution or learned blur-size detectors may be used.

In one or more embodiments, determining the sharpness metric for each image also includes determining (415) a relative degree of blur, or sharpness. Any method may be used to determine the amount of blur. For example, deconvolution or learned blur-size detectors may be used. In one or more embodiments, the relative degree of blur is based on comparing blur between consecutive images in the stack.

The method continues at 420, and the depth map is generated based on the determined sharpness metrics. As an example, for each pixel in the mage, a depth at which the sharpness metric indicated the image was sharpness is selected for use in the depth map.

Figure 5:
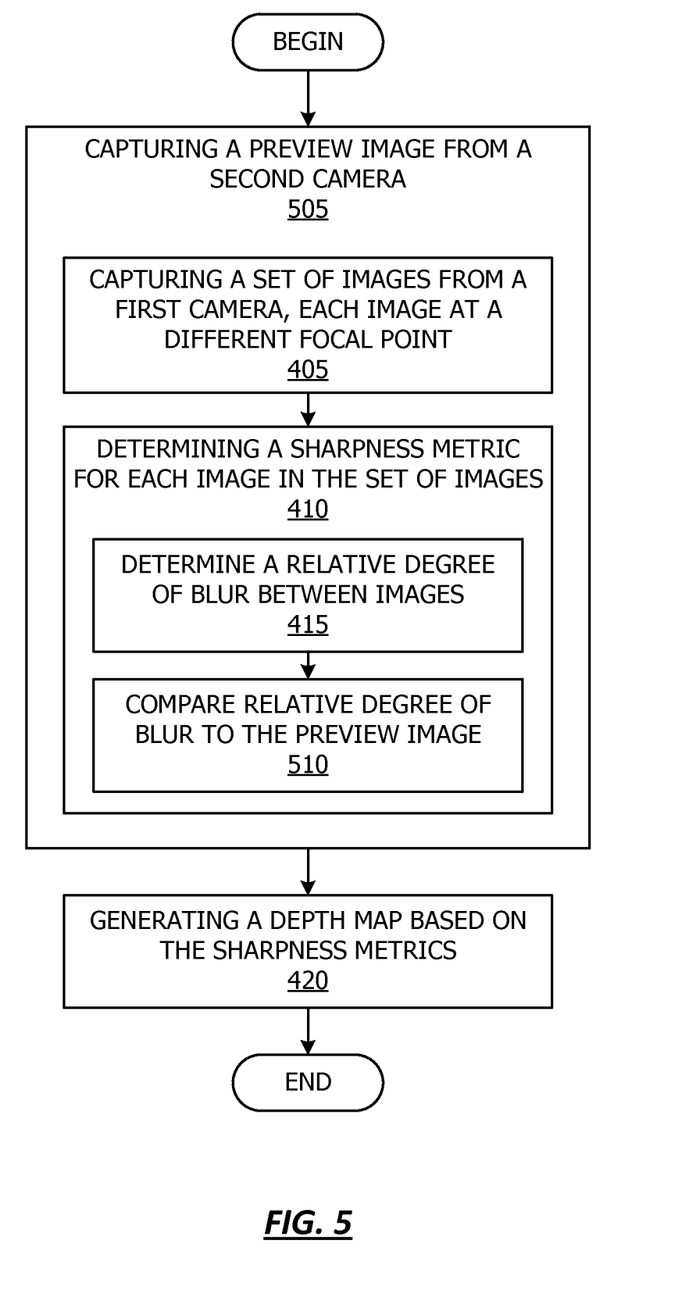
FIG. 5 shows, in flow chart form, an example method of generating a depth map using an image stack and a stereo camera system.

FIG. 5 presents another example flow chart with additional features that may be included according to one or more embodiments. Specifically, FIG. 5 show that while the first camera is capturing a set of images at various depths, at 505, a second camera may be capturing a preview image. In one or more embodiments, the second camera may have a different DOF than the first camera. Further, during 410, determining a sharpness metric for each image in the set of images may optionally include at 510, comparing the determined relative degrees of blur to the preview image. At 420, when the depth map is generated, the depth map may include more reliable results because of the comparison of the estimate relative blur to the preview image.

Figure 6:
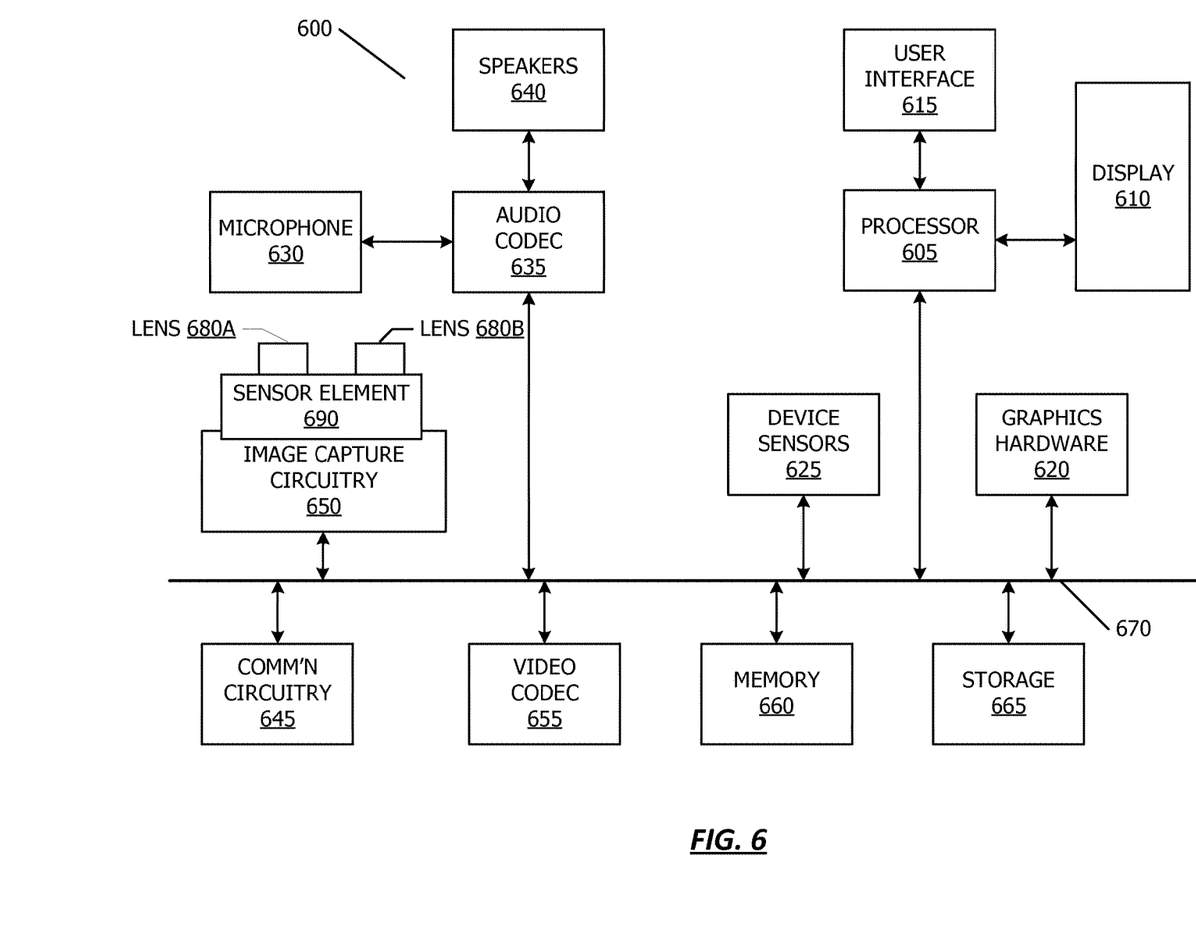
FIG. 6 shows, in block diagram form, a simplified multifunctional device according to one or more embodiments.

Referring now to FIG. 6, a simplified functional block diagram of illustrative multifunction device 600 is shown according to one embodiment. Multifunction electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture circuitry 650 (e.g., including camera system 100) video codec(s) 655 (e.g., in support of digital image capture unit 650), memory 660, storage device 665, and communications bus 670. Multifunction electronic device 600 may be, for example, a digital camera or a personal electronic device such as a personal digital assistant (PDA), personal music player, mobile telephone, or a tablet computer.

Processor 605 may execute instructions necessary to carry out or control the operation of many functions performed by device 600 (e.g., such as the generation and/or processing of images and single and multi-camera calibration as disclosed herein). Processor 605 may, for instance, drive display 610 and receive user input from user interface 615. User interface 615 may allow a user to interact with device 600. For example, user interface 615 can take a variety of forms, such as a button, keypad, dial, a click wheel, keyboard, display screen and/or a touch screen. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable GPU.

Image capture circuitry 650 may include two (or more) lens assemblies 680A and 680B, where each lens assembly may have a separate focal length. For example, lens assembly 680A may have a short focal length relative to the focal length of lens assembly 680B. Each lens assembly may have a separate associated sensor element 690. Alternatively, two or more lens assemblies may share a common sensor element. Image capture circuitry 650 may capture still and/or video images. Output from image capture circuitry 650 may be processed, at least in part, by video codec(s) 665 and/or processor 605 and/or graphics hardware 620, and/or a dedicated image processing unit or pipeline incorporated within circuitry 665. Images so captured may be stored in memory 660 and/or storage 655.

Sensor and camera circuitry 650 may capture still and video images that may be processed in accordance with this disclosure, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory, computer readable media including, for example, magnetic disks (fixed, floppy, and removable) and tape, optical media such as CD-ROMs and digital video disks (DVDs), and semi-conductor memory devices such as Electrically Programmable Read-Only Memory (EPROM), and Electrically Erasable Programmable Read-Only Memory (EEPROM). Memory 660 and storage 665 may be used to tangibly retain computer program instructions or code organized into one or more modules and written in any desired computer programming language. When executed by, for example, processor 605 such computer program code may implement one or more of the methods described herein.

In one or more embodiments, the features described above may be helpful in generating a depth map in situation where the scene, or an object in the scene, does not provide enough variety such that a depth map may be generated by traditional means. For example, a depth map may otherwise be difficult to calculate if there are not enough edges, or if there are too many edges. In addition, in one or more embodiments, only a single image by each of two cameras may be necessary in generating a depth map. Further, in one or more embodiments, a single camera, with known quantities related to a second camera in a stereo camera system, may be necessary in generating a depth map.

Finally, variations of the above-described embodiments may be used in combination with each other. Many other embodiments will be apparent to those of skill in the art upon reviewing the above description. Further, in the case of flow charts described above, the various steps may be depicted in a particular order, but the order in which the features are depicted should not be considered limiting. That is, the various features of the flow chart may occur in a different order, or some may be omitted, or occur concurrently, according to one or more embodiments. The scope of the disclosed subject matter therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method of generating a depth map, comprising:
   obtaining a first image of a scene from a first image capture unit, the first image having a first depth-of-field (DOF) and a first number of pixels;
   obtaining a second image of the scene from a second image capture unit, the second image having a second DOF that is different than the first DOF, the second image having the first number of pixels, wherein each pixel in the second image has a corresponding pixel in the first image;
   for each respective depth of a plurality of specified depths:
      generating a warped image by applying an amount of disparity warping to the first image, wherein the amount of disparity warping applied to generate the warped image corresponds to the respective depth of the plurality of specified depths;
      generating a blurred image by applying an amount of blurring to the second image, wherein the amount of blurring applied to generate the blurred image corresponds to the respective depth of the plurality of specified depths; and
      generating a differential image for the respective depth of the plurality of specified depths by determining a difference between the respective warped image and the respective blurred image; and
   generating a depth map having the first number of pixels, wherein each pixel in the depth map is based on the plurality of generated differential images.

2. The method of claim 1, wherein the first image capture unit comprises a telephoto image capture unit, and wherein the second image capture unit comprises a wide-angle image capture unit.

3. The method of claim 1, wherein generating a depth map further comprises, for each of the plurality of pixels, determining a depth, of the plurality of specified depths, for which the corresponding generated differential image represents a closest match for the respective pixel of the plurality of pixels.

4. The method of claim 1, wherein generating a warped image for a respective depth further comprises:
   determining a disparity for the respective depth, and
   removing the determined disparity, such that the warped image appears as if obtained from the second image capture unit.

5. The method of claim 1, wherein generating a warped image for a respective depth further comprises:
   determining that the first image capture unit and second image capture unit are differently focused; and
   in response to determining that the first image capture unit and the second image capture unit are differently focused, applying an amount of blurring to the warped image that corresponds to the respective depth.

6. A system for generating a depth map, comprising:
   a first lens assembly and second lens assembly;
   a digital image sensor configured to receive light from the first lens assembly and the second lens assembly; and
   a memory operatively coupled to the digital image sensor and comprising computer code configured to cause one or more processors to:
      obtain a first image of a scene using the first lens assembly, the first image having a first depth-of-field (DOF) and a first number of pixels;
      obtain a second image of the scene using the second lens assembly, the second image having a second DOF that is different than the first DOF, the second image having the first number of pixels, wherein each pixel in the second image has a corresponding pixel in the first image;
      for each respective depth of a plurality of specified depths:
         generate a warped image by applying an amount of disparity warping to the first image, wherein the amount of disparity warping applied to generate the warped image corresponds to the respective depth of the plurality of specified depths;
         generate a blurred image by applying an amount of blurring to the second image, wherein the amount of blurring applied to generate the blurred image corresponds to the respective depth of the plurality of specified depths; and
         generate a differential image for the respective depth of the plurality of specified depths by determining a difference between the respective warped image and the respective blurred image; and
      generate a depth map having the first number of pixels, wherein each pixel in the depth map is based on the plurality of generated differential images.

7. The system of claim 6, wherein the first lens assembly comprises a telephoto lens and wherein the second lens assembly comprises a wide angle lens.

8. The system of claim 6, wherein the computer code configured to cause one or more processors to generate a depth map further comprises computer code configured to cause one or more processors to, for each of the plurality of pixels: determine a depth, of the plurality of specified depths, for which the corresponding generated differential image represents a closest match for the respective pixel of the plurality of pixels.

9. The system of claim 6, wherein the computer code configured to cause one or more processors to generate a warped image for a respective depth further comprises computer code configured to cause one or more processors to:
   determine a disparity for the respective depth, and
   remove the determined disparity, such that the warped image appears as if obtained from the second image capture unit.

10. The system of claim 6, wherein the computer code configured to cause one or more processors to generate a warped image for a respective depth further comprises computer code configured to cause one or more processors to:
- determine that the first image capture unit and second image capture unit are differently focused; and
- in response to determining that the first image capture unit and the second image capture unit are differently focused, apply an amount of blurring to the warped image that corresponds to the respective depth.

11. A non-transitory computer readable medium comprising computer code for generating a focus stack, the computer code executable by one or more processors to:
- obtain a first image of a scene using a first image capture device, the first image having a first depth-of-field (DOF) and a first number of pixels;
- obtain a second image of the scene using a second image capture device, the second image having a second DOF that is different than the first DOF, the second image having the first number of pixels, wherein each pixel in the second image has a corresponding pixel in the first image;
- for each respective depth of a plurality of specified depths:
  - generate a warped images by applying an amount of disparity warping to the first image, wherein the amount of disparity warping applied to generate the warped image corresponds to the respective depth of the plurality of specified depths;
  - generate a blurred image by applying an amount of blurring to the second image, wherein the amount of blurring applied to generate the blurred image corresponds to the respective depth of the plurality of specified depths; and
  - generate a differential image for the respective depth of the plurality of specified depths by determining a difference between the respective warped image and the respective blurred image; and
- generate a depth map having the first number of pixels, wherein each pixel in the depth map is based on the plurality of generated differential images.

12. The non-transitory computer readable medium of claim 11, wherein the first image capture device comprises a telephoto lens and wherein the second image capture device comprises a wide angle lens.

13. The non-transitory computer readable medium of claim 11, wherein the computer code executable by the one or more processors to generate a depth map further comprises computer code executable by the one or more processors to, for each of the plurality of pixels: determine a depth, of the plurality of specified depth, for which the corresponding generated differential image represents a closest match for the respective pixel of the plurality of pixels.

14. The non-transitory computer readable medium of claim 11, wherein the computer code executable by the one or more processors to generate a plurality of warped images further comprises computer code executable by the one or more processors to:
- determine a disparity for the respective depth, and
- remove the determined disparity, such that the warped image appears as if obtained from the second image capture unit.

15. The non-transitory readable medium of claim 11, wherein the computer code executable by the one or more processors to generate a warped image for a respective depth further comprises computer code executable by the one or more processors to:
- determine that the first image capture unit and second image capture unit are differently focused; and
- in response to determining that the first image capture unit and the second image capture unit are differently focused, apply an amount of blurring to the warped image that corresponds to the respective depth.

16. The method of claim 1, wherein the plurality of specified depths are predetermined.

17. The method of claim 1, wherein the plurality of blurred images are generated based, at least in part, on at least one lens optical model.

18. The system of claim 6, wherein the plurality of specified depths are predetermined.

19. The system of claim 6, wherein the computer code configured to cause one or more processors to generate a blurred image further comprises computer code configured to cause one or more processors to: generate a blurred image based, at least in part, on at least one lens optical model.

20. The non-transitory computer readable medium of claim 11, wherein the computer code executable by the one or more processors to generate a blurred image further comprises computer code executable by the one or more processors to: generate a blurred image based, at least in part, on at least one lens optical model.

* * * * *

UNITED STATES PATENT AND TRADEMARK OFFICE
CERTIFICATE OF CORRECTION

PATENT NO. : 10,237,473 B2
APPLICATION NO. : 14/864603
DATED : March 19, 2019
INVENTOR(S) : Claus Molgaard et al.

Page 1 of 1

It is certified that error appears in the above-identified patent and that said Letters Patent is hereby corrected as shown below:

In the Claims

Claim 11, at Column 9, Line number 26, replace "images" with -- image --

Signed and Sealed this
Thirtieth Day of April, 2019

Andrei Iancu
*Director of the United States Patent and Trademark Office*